United States Patent [19]

Holzbaur et al.

[11] 4,377,255

[45] Mar. 22, 1983

[54] VALVE

[75] Inventors: Siegfried Holzbaur; Gregor Schuster, both of Stuttgart, Fed. Rep. of Germany

[73] Assignee: Robert Bosch GmbH, Stuttgart, Fed. Rep. of Germany

[21] Appl. No.: 167,582

[22] Filed: Jul. 11, 1980

Related U.S. Application Data

[63] Continuation of Ser. No. 12,187, Feb. 14, 1979, abandoned.

[30] Foreign Application Priority Data

Feb. 22, 1978 [DE] Fed. Rep. of Germany ....... 2807466

[51] Int. Cl.³ .......................................... G05D 23/02
[52] U.S. Cl. .................................... 236/93 R; 251/294
[58] Field of Search ......................... 251/294, 85, 122; 236/93 R

[56] References Cited

U.S. PATENT DOCUMENTS

| | | | |
|---|---|---|---|
| 1,158,401 | 10/1915 | Empson | 251/294 X |
| 1,513,481 | 10/1924 | Brede | 251/294 X |
| 2,063,399 | 12/1936 | Rasmussen | 251/294 X |
| 2,463,951 | 3/1949 | Carter | 236/93 R |
| 2,520,386 | 8/1950 | Dillman | 251/85 X |
| 3,441,045 | 4/1969 | Malone | 137/114 |
| 3,889,706 | 6/1975 | Wallin | 251/294 X |

FOREIGN PATENT DOCUMENTS 2557 of 1915 United Kingdom ................ 251/294

Primary Examiner—William E. Tapolcai, Jr.
Attorney, Agent, or Firm—Edwin E. Greigg

[57] ABSTRACT

A housed valve which serves to control the flow therethrough of a medium is disclosed. The valve comprises a control member which projects into a flow-through aperture and is supported flexibly and elastically on a guide wire attached to the housing. The guide wire may be made of steel wire, and the support in a fixed relationship with the housing may be such that the axial position of the control member with respect to the flow-through aperture can be influenced in accordance with temperature.

4 Claims, 2 Drawing Figures

VALVE

This is a continuation of application Ser. No. 12,187 filed Feb. 14, 1979, now abandoned.

BACKGROUND OF THE INVENTION

The invention relates to a valve having a housing and a control member which projects into a flow-through aperture. A valve is already known in which a control member projecting into a flow-through aperture is supported in a fixed relationship to the housing by means of a Cardan suspension, i.e., suspended from gimbals. A Cardan suspension of this type is not only expensive but in many instances cannot be used at all because of the limited available space therefor.

OBJECT AND SUMMARY OF THE INVENTION

The valve in accordance with the invention, i.e., wherein the control member is supported flexibly and elastically on a guide wire, has the advantage over the prior art in that the centering between the flow-through aperture and the support of the control member must not be so precisely accomplished, should this be desired. Further, that a lateral contact of the control member within the flow-through aperture is made possible and also that the support of the control member requires only very limited space and can be produced very inexpensively.

Another advantage of this invention over the prior art is that the valve is positioned in a housing and its control member includes a conical nozzle needle that is provided with an element that controls lateral movement of the nozzle needle in a guide bore.

A still further and particular advantage of this invention is the support of the guide wire in a fixed relationship to the housing and can be influenced in accordance with temperature, by means of which the axial position of the control member with respect to the flow-through aperture can be modified in accordance with temperature.

The invention will be better understood as well as further objects and advantages thereof become more apparent from the ensuing detailed description of a preferred embodiment taken in conjunction with the drawing.

BRIEF DESCRIPTION OF THE DRAWING

Turning now to the drawings in the valve shown in FIGS. 1 and 2, a conical nozzle needle 3 arranged to serve as the control member is adapted to project through a flow-through aperture 2 within a nozzle element 1. The nozzle element 1 is threadedly supported, for example, within a housing part 5 and has an entrance aperture 6 for the medium controlled by the valve. The nozzle needle 3 is axially secured on a guide wire 7, more particularly a guide wire made of steel wire. The securing of the nozzle needle 3 to the steel wire 7 is preferably accomplished as shown in the drawing in the area of the tip 8 of the nozzle needle 3, that is, at the end remote from the flow-through aperture 2. The steel or guide wire 7 projects without touching, except for its securing within the tip 8, through a bore 9 up to where it is secured in the tip of the nozzle needle 3. The bore 9 thus has a larger diameter than does the guide wire 7. The guide wire 7 is supported at its end remote from the nozzle needle 3 within a carrier body 11 which is secured within an actuation member 12. For example, it may be clamped by means of a screw 13 within a bore 14 of the actuation member 12. Through axial displacement, for example, of the actuation member 12, the nozzle needle 3 opens more or less widely the flow-through aperture 2, so that a quantity of the medium delivered through the entrance aperture 6 can flow out through the annular cross section formed between the nozzle needle 3 and the flow-through aperture 2. An element 11 which operates in accordance with temperature may likewise serve as the carrier body of the guide wire 7, by which means a temperature-dependent displacement of the nozzle needle 3 occurs, so that changes in the flow-through quantity resulting from temperature fluctuations can be compensated. An element of expansible material can, for example, serve as the element 11 operating in accordance with temperature.

Figure 1:
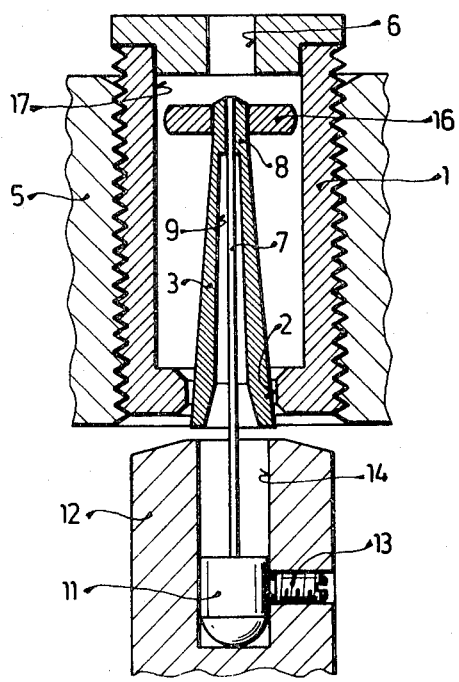
In FIG. 1 the support of the guide wire 7 within the actuation member 12 is accomplished virtually in the axis of the flow-through aperture 2.
Figure 2:
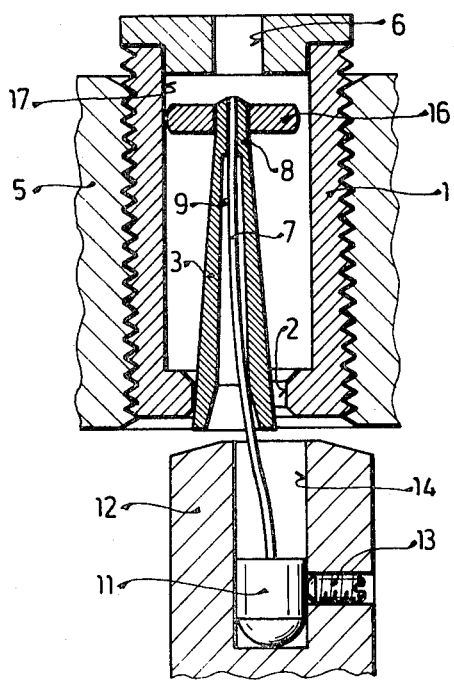
In FIG. 2, the axis of the actuation member 12 is displaced with respect to the axis of the flow-through aperture 2, so that the support of the guide wire 7 in a fixed relationship with the housing is likewise displaced with respect to the axis of the flow-through aperture 2. A displacement of this type, however, does not restrict the functional capacity of the valve embodied in accordance with the invention, since there is no resultant tilting of the nozzle needle within the flow-through aperture 2. The flexible, elastic suspension of the nozzle needle 3 on the guide wire 7 permits continuous problem-free actuation when the displacement between the support of the nozzle needle 3 and the axis of the flow-through aperture 2 is present, as described. In fact, it is even desirable with certain flow-through quantities that the nozzle needle should lean against one side of the flow-through aperture in order to obtain constant flow-through coefficients and in order to prevent the nozzle needle from moving to and fro. A certain axial guidance may be attained, if desired, by means of the disposition of a guide disc 16 in proximity to the tip 8, the disc 16 being embodied with a rounded outer circumference and capable of gliding within a guide bore 17 of the nozzle element 1. The support of the nozzle needle 3 via the guide wire 7 in accordance with the invention thus permits not only a lateral displacement but also requires only very limited structural space and can be produced inexpensively.

The foregoing relates to a preferred embodiment of the invention, it being understood that other embodiments and variants thereof are possible within the spirit and scope of the invention, the latter being defined by the appended claims.

What is claimed and desired to be Secured by Letters Patent of the United States is:

1. A valve having a housing provided with a nozzle element, said nozzle element having a flow-through aperture, a conical nozzle needle having a tip and arranged to project into said flow-through aperture, said flow-through aperture having a larger cross-section than said conical nozzle needle, said valve further having an actuation member, said actuation member having a bore therein to receive a carrier body, said carrier body being attached to an extremity of a flexible elastic steel wire, said steel wire extending into a bore in said conical nozzle needle to said tip thereof, said steel wire allowing said actuation member to actuate said conical nozzle needle asymmetrically wherein said conical nozzle needle includes a circular disc mounted at said conical nozzle tip to control lateral movement of said conical nozzle needle in said guide bore.

2. A valve in accordance with claim 1, further wherein said nozzle needle is arranged to control flow through said aperture in said nozzle element.

3. A valve is accordance with claim 1, further wherein said lateral movement of said nozzle needle controls said flow-through aperture.

4. A valve in accordance with claim 1, further wherein said steel wire and said conical nozzle needle are capable of being influenced in accordance with variations in temperature of said carrier body connected to said steel wire.

* * * * *